(12) United States Patent
Aoki et al.

(10) Patent No.: US 10,144,081 B2
(45) Date of Patent: Dec. 4, 2018

(54) ARC WELDING CONTROL SYSTEM AND METHOD

(71) Applicant: KAWASAKI JUKOGYO KABUSHIKI KAISHA, Kobe-shi, Hyogo (JP)

(72) Inventors: Atsuhito Aoki, Kobe (JP); Masatsugu Takeichi, Kobe (JP); Masaru Seto, Kobe (JP); Yukio Ikezawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 441 days.

(21) Appl. No.: 14/962,767

(22) Filed: Dec. 8, 2015

(65) Prior Publication Data

US 2016/0107255 A1 Apr. 21, 2016

Related U.S. Application Data

(62) Division of application No. 13/881,096, filed as application No. PCT/JP2011/003872 on Jul. 6, 2011.

(30) Foreign Application Priority Data

Oct. 26, 2010 (JP) ................. 2010-240089

(51) Int. Cl.
*B23K 9/09* (2006.01)
*B23K 9/095* (2006.01)
(Continued)

(52) U.S. Cl.
CPC .............. *B23K 9/09* (2013.01); *B23K 9/0216* (2013.01); *B23K 9/095* (2013.01); *B23K 9/0953* (2013.01); *B23K 9/0956* (2013.01); *B23K 9/127* (2013.01)

(58) Field of Classification Search
CPC . B23K 9/10; B23K 9/09; B23K 9/095; B23K 9/12
(Continued)

(56) References Cited

U.S. PATENT DOCUMENTS 3,646,309 A * 2/1972 Smith, Jr. et al. ... B23K 9/0216
219/124.02
3,924,094 A 12/1975 Hansen et al.
(Continued)

FOREIGN PATENT DOCUMENTS

JP S62-230476 A 10/1987
JP S62-267071 A 11/1987
(Continued)

OTHER PUBLICATIONS

Feb. 4, 2016 Office Action issued in U.S. Appl. No. 13/881,096.
Oct. 18, 2011 International Search Report issued in International Patent Application No. PCT/JP2011/003872.

*Primary Examiner* — Dana Ross
*Assistant Examiner* — Ayub Maye
(74) *Attorney, Agent, or Firm* — Oliff PLC

(57) ABSTRACT

The present invention provides an arc welding control system and method capable of simultaneously, sophisticatedly performing a weaving width control operation and a torch height control operation. Influence ratios ($\delta_w$ and $\delta_z$) of influences of a torch height deviation ($\Delta P_h$) and a groove wall distance deviation ($\Delta P_d$) with respect to a manipulated variable ($\Delta w$) of a weaving width and a manipulated variable ($\Delta z$) of a torch height are set in accordance with a groove angle ($\theta$) of a workpiece (5). A calculation unit (21) calculates the manipulated variables ($\Delta z$ and $\Delta w$) of actuators (13 and 14) regarding the torch height and the weaving width such that the influence ratios ($\delta_w$ and $\delta_z$) become large as the groove angle ($\theta$) becomes large.

4 Claims, 10 Drawing Sheets

(51) Int. Cl.
*B23K 9/127* (2006.01)
*B23K 9/02* (2006.01)

(58) Field of Classification Search
USPC .............. 219/124.02, 124.03, 124.1, 124.21, 219/124.32, 124.33, 124.34
See application file for complete search history.

(56) References Cited

U.S. PATENT DOCUMENTS

| | | | |
|---|---|---|---|
| 4,336,440 A | 6/1982 | Cook et al. | |
| 4,477,713 A * | 10/1984 | Cook ................... | B23K 9/0216 |
| | | | 219/124.34 |
| 4,495,400 A * | 1/1985 | Thompson ............. | B23K 9/127 |
| | | | 219/124.22 |
| 4,556,777 A * | 12/1985 | Sarugaku ............... | B23K 9/127 |
| | | | 219/124.34 |
| 7,397,015 B2 | 7/2008 | Peters | |
| 2005/0103766 A1 | 5/2005 | Iizuka et al. | |

FOREIGN PATENT DOCUMENTS

| | | |
|---|---|---|
| JP | H04-70117 B2 | 11/1992 |
| JP | 2000-158136 A | 6/2000 |
| JP | 3532067 B2 | 5/2004 |

\* cited by examiner

ARC WELDING CONTROL SYSTEM AND METHOD

This is a Divisional of U.S. application Ser. No. 13/881,096 filed Aug. 2, 2013, which is a National Stage of International Application No. PCT/JP2011/003872 filed Jul. 6, 2011 which claims priority to JP2010-240089 filed Oct. 26, 2010. The prior applications, including the specifications, drawings and abstract are incorporated herein by reference in their entirety.

TECHNICAL FIELD

The present invention relates to an arc welding control system and method of controlling the position of a welding torch in accordance with an arc current or voltage.

BACKGROUND ART

Known is a technology of performing arc welding with respect to a workpiece that is a welding target while causing a welding torch to automatically track a weld line of the workpiece. Such an automatic arc welding device needs to perform a control operation in which while causing the welding torch to move in a cyclic manner in a width direction of a groove of the workpiece with a specified weaving width and a specified torch height, the welding torch is caused to move such that beads are obtained in a direction along the weld line of the workpiece. In this control operation, it is necessary to understand a relative positional relation between the welding torch and the weld line of the workpiece. For example, a position sensor, such as a laser sensor, may be provided on the welding torch. However, the position sensor is expensive, and in the case of welding a narrow portion, the position sensor may become an obstacle.

Here, in a welding operation taking advantage of the characteristics of welding arc and using an arc sensor that does not require an additional device around the welding torch, the position of the welding torch is understood by detecting an arc welding current or arc voltage generated between the workpiece and an electrode projecting from a tip end of the welding torch and calculating a distance between a tip end of the electrode and the workpiece. Specifically, weld line tracking can be controlled by comparing welding current values or arc voltage values at both ends of weaving, and the torch height can be controlled by comparing the welding current value or arc voltage value in the weaving with a target value.

Further, also known is a method of controlling the weaving width in order to realize an appropriate weaving width with respect to a groove width of the workpiece (see PTL 1, for example). In this case, a control operation of increasing or decreasing the weaving width by comparing the welding current value or arc voltage value at the end portion of the weaving with the target value is performed.

CITATION LIST

Patent Literature

PTL 1: Japanese Examined Patent Application Publication No. 4-70117

SUMMARY OF INVENTION

Technical Problem

In the above method of PTL 1, the weaving width control operation and the torch height control operation are performed independently. However, the weaving width control operation and the torch height control operation influence each other. Therefore, the following problems occur when optimizing respective control operations.

Each of FIGS. 11A to 11C is a schematic diagram for explaining problems in a conventional arc sensor weaving width control operation. In the case of an initial weaving width $w_0$ and an initial torch height $z_0$ as shown in FIG. 11A, a control operation of increasing a weaving width w is performed such that a horizontal distance (wall distance) between an end portion of the weaving width w and the workpiece becomes a target value $d_{ref}$, and a control operation of decreasing a torch height z is performed such that the torch height z becomes a target value $z_{ref}$. In this case, as shown in FIG. 11B, the horizontal distance between the end portion of the weaving width and the workpiece decreases by the decrease in the torch height. Therefore, the weaving width w becomes larger than a target weaving width $w_t$ at the target torch height $z_{ref}$. Generally, the weaving width control operation and the torch height control operation are changed little by little at every predetermined control cycle. Therefore, regarding the weaving width w, as shown by a broken line in FIG. 11C, it is desirable that the weaving width w gradually get close to the target weaving width $w_t$ from the initial weaving width $w_0$ as the control cycle is repeated. However, in the above conventional configuration, the control operation of increasing the weaving width w is performed although it is actually necessary to perform the control operation of decreasing the weaving width w such that the initial weaving width $w_0$ gets close to the target weaving width $w_t$. Therefore, as shown by a solid line in FIG. 11C, the weaving width w changes in a direction opposite to the target value, and it takes time to stabilize the weaving width w at the target value.

As above, in a case where the weaving width control operation and the torch height control operation are individually, optimally performed, the horizontal distance between the welding torch and the workpiece consequently gets too close to each other, and this may cause problems that weld defects occur, or the welding torch and the workpiece contact each other. Therefore, in the conventional method, in order to prevent the problems, such as the weld defects, from occurring while independently performing the weaving width control operation and the torch height control operation, gain has to be decreased in each control operation, so that high-performance control operations cannot be performed.

Moreover, the weaving width control operation and the torch height control operation can be alternately performed in accordance with the cycle of the weaving. To be specific, this method can realize that the torch height control operation is not performed when the weaving width control operation is performed, and the weaving width control operation is not performed when the torch height control operation is performed. With this, the problems, such as the weld defects, do not occur. However, regarding each control operation, there exists a period in which the control operation is not performed. As a result, the gains substantially become half, so that the high-performance control operations cannot be performed.

The present invention was made to solve the above problems, and an object of the present invention is to provide an arc welding control system and method capable of simultaneously, sophisticatedly performing the weaving width control operation and the torch height control operation.

Solution to Problem

An arc welding control system according to the present invention is an arc sensor control system for arc welding for obtaining satisfactory beads in a groove of a workpiece that is a welding target, the arc sensor control system including: an actuator configured to cause a welding torch to track a weld line of the workpiece by causing the welding torch to move in a direction of the weld line of the workpiece at a specified torch height while causing the welding torch to move in a cyclic manner in a width direction of the groove of the workpiece with a specified weaving width; a sensor configured to detect a welding current or an arc voltage; a calculation unit configured to obtain from the welding current or the arc voltage a value corresponding to a groove wall distance indicating a horizontal distance between the welding torch and the workpiece at a weaving end portion and a value corresponding to the torch height, calculate a difference between the value corresponding to the groove wall distance and a target value and a difference between the value corresponding to the torch height and a target value, calculate a manipulated variable of the actuator regarding the weaving width from a deviation (hereinafter referred to as a "groove wall distance deviation") of the value corresponding to the groove wall distance from the target value and a deviation (hereinafter referred to as a "torch height deviation") of the value corresponding to the torch height from the target value, and calculate a manipulated variable of the actuator regarding the torch height from the groove wall distance deviation and the torch height deviation; and a control unit configured to control the weaving width and the torch height based on the manipulated variable regarding the weaving width and the manipulated variable regarding the torch height, wherein: a ratio (hereinafter referred to as an influence ratio) of an influence of the groove wall distance deviation with respect to each of the manipulated variable of the weaving width and the manipulated variable of the torch height and a ratio (hereinafter referred to as an influence ratio) of an influence of the torch height deviation with respect to each of the manipulated variable of the weaving width and the manipulated variable of the torch height are set in accordance with a groove angle of the workpiece; and the influence ratio of the groove wall distance deviation and the influence ratio of the torch height deviation are set such that as the groove angle becomes large, the influence ratio of the torch height deviation becomes relatively larger than the influence ratio of the groove wall distance deviation.

According to the above configuration, when causing the welding torch to track the weld line, the manipulated variable of the horizontal actuator regarding the weaving width and the manipulated variable of the vertical actuator regarding the torch height are calculated using both the value corresponding to the groove wall distance and the value corresponding to the torch height, the values being obtained from the welding current or arc voltage detected by the sensor. In addition, the influence ratios (weight coefficients) by which parameters regarding the groove wall distance deviation and the torch height deviation in respective manipulated variables are multiplied are set in accordance with the groove angle of the workpiece. Then, as a result of diligent studies, the present inventors have obtained findings that by realizing a setting in which the influence ratio of the torch height deviation becomes relatively larger than the influence ratio of the groove wall distance deviation in each manipulated variable as the groove angle of the workpiece becomes large, the weaving width and the torch height can be quickly, optimally controlled without decreasing the gain. Therefore, with the above configuration, the weaving width control operation and the torch height control operation can be simultaneously, sophisticatedly performed.

The manipulated variable may be obtained by multiplying the influence ratio by an adjustment coefficient for adjusting the influence ratio. With this, even if the groove angle stays the same, a more preferable control performance can be realized depending on the shape and use of the workpiece.

Further, a manipulated variable $\Delta z$ of the torch height may be represented by Formula 1 below, and a manipulated variable $\Delta w$ of the weaving width may be represented by Formula 2 below, $$\Delta z = K_z\left(-\frac{\Delta P_d}{t} + 2K_h\Delta P_h\right) \quad \text{Formula 1}$$

$$\Delta w = 4K_w(-\Delta P_d + tK_h\Delta P_h) \quad \text{Formula 2}$$

where $K_z$ denotes a gain of the manipulated variable regarding the torch height, $K_w$ denotes a gain of the manipulated variable regarding the weaving width, $\Delta P_d$ denotes the groove wall distance deviation, $\Delta P_h$ denotes the torch height deviation, t denotes a value represented by "$t=\tan(\theta/2)$" where $\theta$ denotes the groove angle, and $K_h$ denotes the adjustment coefficient.

According to this, since the influence ratio of the torch height deviation in the manipulated variable of the torch height becomes larger than that in the manipulated variable of the weaving width, the control operation can be performed while more strongly reflecting the torch height deviation.

The calculation unit may be configured to: calculate an average value of the welding current or arc voltage for each of a plurality of sections of one weaving cycle, the welding current or arc voltage being detected by the sensor, the plurality of sections being obtained by dividing one weaving cycle into a predetermined number; obtain the value corresponding to the groove wall distance based on the average value of one or a plurality of sections corresponding to the weaving end portion among the plurality of sections; and obtain the value corresponding to the torch height based on the average value of the welding current or arc voltage of one weaving cycle. As above, by dividing the welding current or the arc voltage in accordance with the weaving cycle, the arc current or voltage at each position of the welding torch can be easily calculated.

An arc sensor control method according to the present invention is a method of controlling an arc sensor for arc welding for obtaining beads in a groove of a workpiece that is a welding target, the method utilizing: an actuator configured to cause a welding torch to track a weld line of the workpiece by causing the welding torch to move in a direction of the weld line of the workpiece at a specified torch height while causing the welding torch to move in a cyclic manner in a width direction of the groove of the workpiece with a specified weaving width; and a sensor configured to detect a welding current or an arc voltage, the method including the steps of: detecting the welding current or the arc voltage; obtaining from the welding current or the arc voltage a value corresponding to a groove wall distance indicating a horizontal distance between the welding torch and the workpiece at a weaving end portion and a value corresponding to the torch height to calculate a difference between the value corresponding to the groove wall distance and a target value and a difference between the value corresponding to the torch height and a target value; calculating a manipulated variable of the actuator regarding the weaving width from a deviation (hereinafter referred to as a "groove wall distance deviation") of the value corresponding to the groove wall distance from the target value and a deviation (hereinafter referred to as a "torch height deviation") of the value corresponding to the torch height from the target value, and calculating a manipulated variable of the actuator regarding the torch height from the groove wall distance deviation and the torch height deviation; and controlling the weaving width and the torch height based on the manipulated variable regarding the weaving width and the manipulated variable regarding the torch height, wherein: a ratio (hereinafter referred to as an influence ratio) of an influence of the groove wall distance deviation with respect to each of the manipulated variable of the weaving width and the manipulated variable of the torch height and a ratio (hereinafter referred to as an influence ratio) of an influence of the torch height deviation with respect to each of the manipulated variable of the weaving width and the manipulated variable of the torch height are set in accordance with a groove angle of the workpiece; and the influence ratio of the groove wall distance deviation and the influence ratio of the torch height deviation are set such that as the groove angle becomes large, the influence ratio of the torch height deviation becomes relatively larger than the influence ratio of the groove wall distance deviation.

According to the above method, when causing the welding torch to track the weld line, the manipulated variable of the weaving width and the manipulated variable of the torch height are calculated using both the value corresponding to the groove wall distance and the value corresponding to the torch height, the values being obtained from the welding current or arc voltage detected by the sensor. In addition, the influence ratios (weight coefficients) by which parameters regarding the groove wall distance deviation and the torch height deviation in respective manipulated variables are multiplied are set in accordance with the groove angle of the workpiece. Then, as a result of diligent studies, the present inventors have obtained findings that by realizing a setting in which the influence ratio of the torch height deviation becomes relatively larger than the influence ratio of the groove wall distance deviation in each manipulated variable as the groove angle of the workpiece becomes large, the weaving width and the torch height can be quickly, optimally controlled without decreasing the gain. Therefore, by performing the control operation using the above method, the weaving width control operation and the torch height control operation can be simultaneously, sophisticatedly performed.

The above object, other objects, features and advantages of the present invention will be made clear by the following detailed explanation of preferred embodiments with reference to the attached drawings.

Advantageous Effects of Invention

The present invention is configured as explained above and has an effect of being able to simultaneously, sophisticatedly perform the weaving width control operation and the torch height control operation.

DESCRIPTION OF EMBODIMENTS

Figure 1:
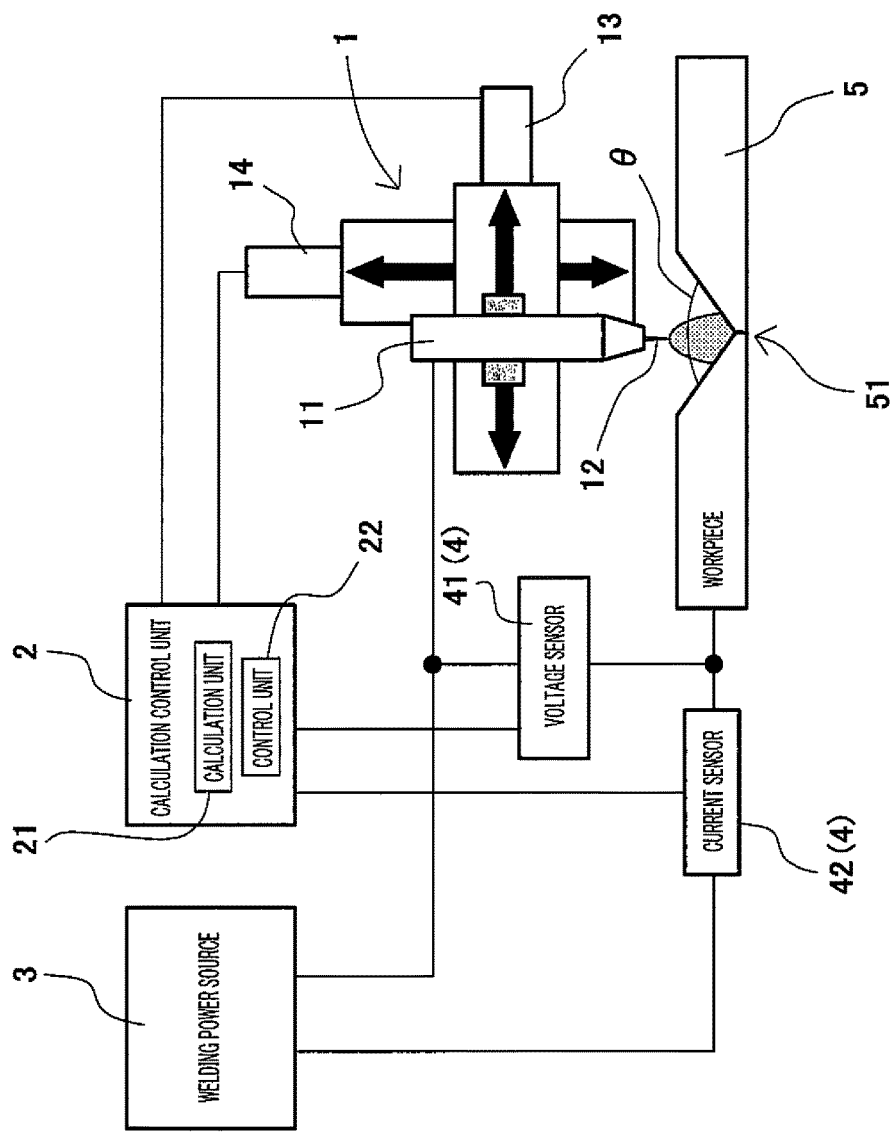
FIG. 1 is a block diagram showing the schematic configuration of an arc welding control system according to one embodiment of the present invention.

Hereinafter, an embodiment of the present invention will be explained in reference to the drawings. In the drawings, the same reference signs are used for the same or corresponding components, and a repetition of the same explanation is avoided.

FIG. 1 is a block diagram showing the schematic configuration of a welding system to which an arc welding arc sensor control system according to one embodiment of the present invention is applied. As shown in FIG. 1, the welding system to which the arc welding arc sensor control system of the present embodiment is applied includes: a welding manipulator 1; a calculation control unit 2 configured to control the welding manipulator 1; a welding power source 3 configured to generate an arc at the welding manipulator 1; and a sensor 4 configured to detect an arc welding current and an arc voltage.

The welding manipulator 1 includes a welding torch 11 including a nozzle configured to supply a shielding gas to a welded portion. An electrode 12 is provided at a tip end (lower end) of the welding torch 11. An electric power line extending from the welding power source 3 is connected to the welding torch 11, and electric power is supplied to the welding torch 11. The welding manipulator 1 includes a horizontal actuator 13 configured to cause the welding torch 11 to move in a horizontal axis direction and a vertical actuator 14 configured to cause the welding torch 11 to move in a vertical direction. Each of the horizontal actuator 13 and the vertical actuator 14 operates based on a control signal output from the calculation control unit 2 and causes the welding torch 11 to move in the horizontal direction or the vertical direction. This configuration may be configured by a multiple-joint robot including the welding torch 11 at a tip end portion thereof.

A workpiece 5 that is a welding target is placed under the welding torch 11. Regarding the workpiece 5, two welded materials are arranged face to face, and a groove 51 is formed at a portion that should be welded. Regarding the groove 51, two welded materials are arranged face to face such that respective groove surfaces form a predetermined groove angle $\theta$. Since there is a case that the vicinity of a portion where the welded materials contact each other is a curved surface, the groove angle $\theta$ denotes an angle between surfaces respectively extended from the groove surfaces.

The welding power source 3 is configured such that the electric power line of the welding power source 3 is also connected to the workpiece 5. A voltage is applied to between the welding torch 11 (the electrode 12 of the welding torch 11) and the workpiece 5 by the electric power supplied from the welding power source 3, and the arc is generated between the electrode 12 projecting from the tip end of the welding torch 11 and the workpiece 5. With this, the workpiece 5 is welded, and the beads are formed. As the sensor 4, a voltage sensor 41 configured to detect the arc voltage between the welding current and the arc voltage is provided between the electric power line extending between the welding power source 3 and the welding torch 11 and the electric power line extending between the welding power source 3 and the workpiece 5. Further, in the present embodiment, a current sensor 42 is also provided as the sensor 4 on one of the above electric power lines. The present embodiment includes both the voltage sensor 41 configured to detect the arc voltage value and the current sensor 42 configured to detect the welding current value as the sensors 4 each configured to detect the welding current or the arc voltage. However, the present embodiment may include only one of these sensors. Moreover, each sensor may directly or indirectly detect the welding current or arc voltage between power supply lines extending from the welding power source 3. Generally, control operations in MIG welding, MAG welding, and CO2 welding are performed based on the current value, and a control operation in TIG welding is performed based on the voltage value. Therefore, the configuration may be changed or appropriately used depending on the type of the welding.

The calculation control unit 2 functions as a calculation unit 21 configured to: obtain from the arc voltage or welding current when causing the welding torch to track the weld line, a value corresponding to a groove wall distance indicating a horizontal distance between the welding torch 11 at the end portion of the weaving and a groove wall of the workpiece 5 and a value corresponding to the torch height; calculate a difference between the value corresponding to the groove wall distance and a target value and a difference between the value corresponding to the torch height and a target value; calculate a manipulated variable regarding the weaving width of the actuator (to be specific, a manipulated variable of the horizontal actuator 13) from a deviation (a groove wall distance deviation) of the value corresponding to the groove wall distance from the target value and a deviation (a torch height deviation) of the value corresponding to the torch height from the target value; and calculate a manipulated variable regarding the torch height of the actuator (to be specific, a manipulated variable of the vertical actuator 14) from the groove wall distance deviation and the torch height deviation. Further, the calculation control unit 2 functions as a control unit 22 configured to control the actuators 13 and 14 of the welding manipulator 1 based on the manipulated variable regarding the weaving width and the manipulated variable regarding the torch height. Specifically, the calculation control unit 2 that functions as the control unit 22 of the present embodiment causes the welding torch 11 to move in a cyclic manner in a width direction of the groove 51 of the workpiece 5 that is the welding target with a specified weaving width and also causes the welding torch 11 to move in a direction along the weld line of the groove 51 of the workpiece 5 at a specified torch height based on the welding current or arc voltage detected by the sensor 4, thereby obtaining the beads on the groove 51 of the workpiece 5. The calculation control unit 2 may have any configuration as long as it has a processing function. For example, the calculation control unit 2 may be constituted by a microcontroller, CPU, MPU, PLC (Programmable Logic Controller), logic circuit, or the like. Moreover, the present embodiment explains a case where one calculation control unit 2 functions as both the calculation unit 21 and the control unit 22. However, the calculation unit 21 and the control unit 22 may be separately configured as a control unit and a calculation unit.

Figure 2:
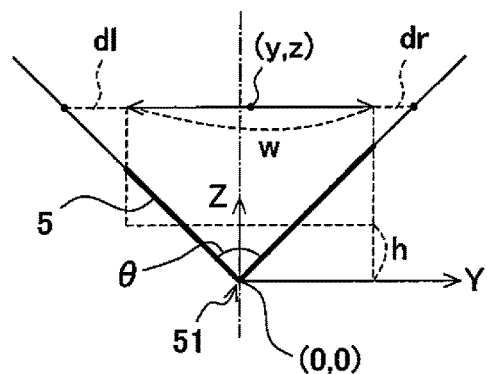
FIG. 2 is a diagram showing a geometric model obtained by modeling a positional relation between a welding torch of a welding system shown in FIG. 1 and a workpiece.

Hereinafter, specific control modes will be explained. First, the calculation control unit 2 obtains the value corresponding to the groove wall distance and the value corresponding to the torch height from the welding current or arc voltage detected by the sensor 4. For this purpose, in the present embodiment, the horizontal distance between the welding torch 11 at the end portion of the weaving and the workpiece 5 and the average height of the welding torch 11 are calculated from the arc voltage. FIG. 2 is a diagram showing a geometric model obtained by modeling the positional relation between the welding torch of the welding system shown in FIG. 1 and the workpiece.

As shown in FIG. 2, a lower end of the groove 51 is an origin, a y-axis extends in the horizontal direction, and a z-axis extends in the vertical direction. In addition, a central coordinate of the weaving width w is (y, z), and these are used as control parameters. In addition, a horizontal distance between a left end of the weaving width w and a left wall (left welded material) of the workpiece 5 is denoted by dl, a horizontal distance between a right end of the weaving width and a right wall (right welded material) of the workpiece 5 is denoted by dr, and an average value of a vertical distance from a weaving position to the workpiece 5 is an average torch height h.

Here, as a result of diligent studies, the inventors of the present invention have expressed the relations among the above parameters as formulas below. To be specific, each of the horizontal distances dl and dr and the average torch height h is set to be expressed by using a certain ratio of the weaving width w and a certain ratio of an actual torch height z at a weaving center.

$$\begin{bmatrix} dl \\ dr \\ h \end{bmatrix} = \begin{bmatrix} 1 & t & -\frac{1}{2} \\ -1 & t & -\frac{1}{2} \\ 0 & 1 & -\frac{1}{4t} \end{bmatrix} \begin{bmatrix} y \\ z \\ w \end{bmatrix}, \quad \text{Formula 3}$$

$$t = \tan\frac{\theta}{2}$$

Figure 3:
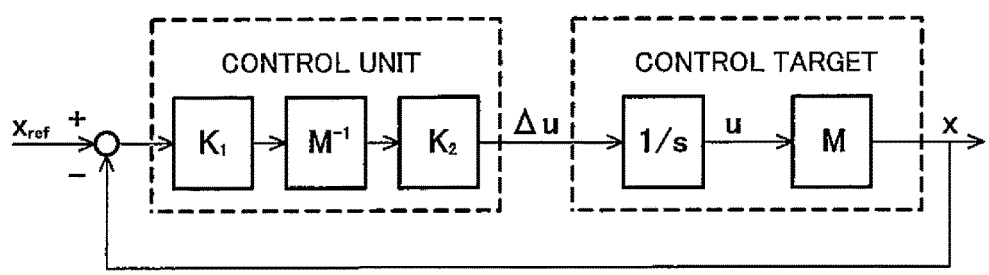
FIG. 3 is a block diagram showing a control model of the welding system shown in FIG. 1.

Then, the control model using Formula 3 above is applied to the present embodiment, and the control unit 22 performs control operations based on the applied control model. FIG. 3 is a block diagram showing the control model of the welding system shown in FIG. 1. According to the block diagram of FIG. 3, Formula 3 is expressed as x=Mu, where x denotes an output vector, and u denotes an input vector. A manipulated variable $\Delta u$ at this time is expressed as $\Delta u = K_2 M^{-1} K_1 (x_{ref} - x)$, where $X_{ref}$ denotes the target value, and each of $K_1$ and $K_2$ denotes the gain. Relational expressions of respective parameters at this time are expressed as formulas below.

$$\begin{bmatrix} \Delta y \\ \Delta z \\ \Delta w \end{bmatrix} = \begin{bmatrix} k_y & 0 & 0 \\ 0 & k_z & 0 \\ 0 & 0 & k_w \end{bmatrix} \begin{bmatrix} 1/2 & -1/2 & 0 \\ -1/2t & -1/2t & 2 \\ -2 & -2 & 4t \end{bmatrix} \begin{bmatrix} 1 & 0 & 0 \\ 0 & 1 & 0 \\ 0 & 0 & k_h \end{bmatrix} \quad \text{Formula 4}$$

$$\begin{bmatrix} dl_{ref} - dl \\ dr_{ref} - dr \\ h_{ref} - h \end{bmatrix}$$

Formulas below are obtained by developing Formula 4.

$$\Delta y = \frac{k_y}{2}(-dl + dr) \quad \text{Formula 5}$$

$$\Delta z = \frac{k_z}{t}\left\{-\left(d_{ref} - \frac{dl + dr}{2}\right) + 2tk_h(h_{ref} - h)\right\}$$

$$\Delta w = 4k_w\left\{-\left(d_{ref} - \frac{dl + dr}{2}\right) + tk_h(h_{ref} - h)\right\}$$

Here, since it is known that a distance d and a voltage V have a relation of a linear expression (d=mV+b, where each of m and b is a constant), formulas below are obtained by converting Formula 5 using the above linear expression.

$$\Delta y = \frac{K_y}{2}(-V_{dl} + V_{dr}) \quad \text{Formula 6}$$

$$\Delta z = \frac{K_z}{t}\left\{-\left(V_{dref} - \frac{V_{dl} + V_{dr}}{2}\right) + 2tK_h(V_{ref} - V_h)\right\}$$

$$\Delta w = 4K_w\left\{-\left(V_{dref} - \frac{V_{dl} + V_{dr}}{2}\right) + tK_h(V_{href} - V_h)\right\}$$

According to the above, $\Delta y$ denotes the manipulated variable of the weld line tracking, $\Delta z$ denotes the manipulated variable of the torch height, and $\Delta w$ denotes the manipulated variable of the weaving width.

As a result of the derivations of these formulas, the present inventors have obtained findings that the weaving width w and the torch height z can be sophisticatedly, optimally controlled without decreasing the gain by realizing a setting in which regarding each of the above manipulated variables, a ratio of an influence of the torch height deviation becomes relatively larger than a ratio of an influence of the groove wall distance deviation as the groove angle θ of the workpiece 5 increases according to Formula 6.

Here, "$V_{dref} - (V_{dl} + V_{dr})/2$" denotes the groove wall distance deviation, and "$V_{href} - V_h$" denotes the torch height deviation. Therefore, when the groove wall distance deviation is denoted by $\Delta P_d$, and the torch height deviation is denoted by $\Delta P_h$, the manipulated variable $\Delta z$ of the torch height is represented by Formula 7 below, and the manipulated variable $\Delta w$ of the weaving width w is represented by Formula 8 below.

$$\Delta z = K_z\left(-\frac{\Delta P_d}{t} + 2K_h\Delta P_h\right) \quad \text{Formula 7}$$

$$\Delta w = 4K_w(-\Delta P_d + tK_h\Delta P_h) \quad \text{Formula 8}$$

Here, $K_z$ denotes a gain of the manipulated variable regarding the torch height, $K_w$ denotes a gain of the manipulated variable regarding the weaving width, and $K_h$ denotes an adjustment coefficient.

Figure 4:
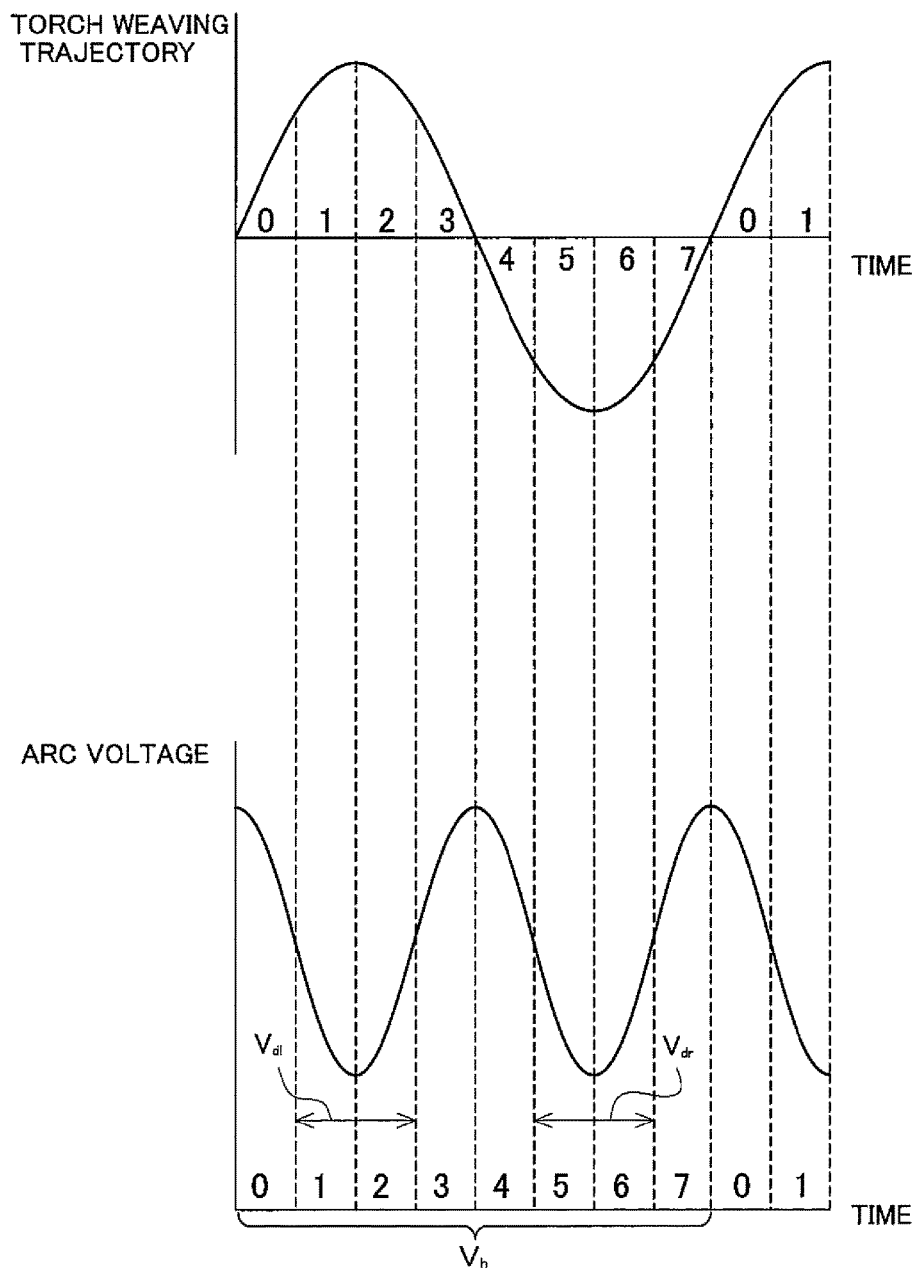
FIG. 4 is a diagram showing a trajectory of the welding torch of the welding system shown in FIG. 1 and an arc voltage change corresponding to the trajectory.

Next, a method of detecting $V_{dl}, V_{dr},$ and $V_h$ that are input parameters of Formula 6 obtained as above will be explained. FIG. 4 is a diagram showing a weaving trajectory of the welding torch of the welding system shown in FIG. 1 and an arc voltage change corresponding to the weaving trajectory. An upper side of FIG. 4 shows a graph of a torch weaving trajectory, and a lower side of FIG. 4 shows a graph of the arc voltage change corresponding to the torch weaving trajectory. In the graph of the torch trajectory, the initial value is set to zero.

In the present embodiment, the calculation unit 21 is configured to: calculate an average value of the arc voltage for each of a plurality of sections of one weaving cycle, the arc voltage being detected by the sensor 4, the plurality of sections being obtained by dividing one weaving cycle into a predetermined number; obtain the value (voltage value) corresponding to the groove wall distance based on the average value of one or a plurality of sections corresponding to the calculated weaving end portion among the plurality of sections; and obtain the value (voltage value) corresponding to the torch height based on the average value of the arc voltage of one weaving cycle. Specifically, as shown in the lower side of FIG. 4, for example, one weaving cycle is divided into eight equal sections, an average arc voltage value of the sections (in the example of FIG. 4, sections 1 and 2 among eight sections 0 to 7) corresponding to one weaving end portion is used as a voltage $V_{dl}$ at the weaving end portion, an average arc voltage value of the sections (in the example of FIG. 4, sections 5 and 6 among eight sections 0 to 7) corresponding to the other weaving end portion is used as a voltage $V_{dr}$ at the weaving end portion, and an average arc voltage value of one weaving cycle is used as a voltage $V_h$ indicating the torch height.

As above, by dividing the welding current or the arc voltage in accordance with the weaving cycle, the arc voltage at each position of the welding torch can be easily calculated. In the present embodiment, the arc voltage at the weaving end portion is detected by dividing one weaving cycle into eight equal sections. However, the number of divided sections may be increased or decreased as long as the arc voltage at the weaving end portion can be detected. Moreover, a peak voltage value at the weaving end portion may be used as the arc voltage at the weaving end portion. Moreover, a voltage at a weaving middle position may be detected as a voltage indicating a voltage of the torch height. Further, in consumable electrode welding, such as the MIG welding, the MAG welding, and the CO2 welding, if the distance between a point end of a wire that is the electrode 12 and the workpiece becomes equal to or shorter than a predetermined distance, the arc extinction occurs. Thus, the amount of time of short circuit (short circuit duration) increases, and the number of times of short circuit (short circuit frequency) increases. Therefore, the distance between the point end of the wire and the workpiece can also be estimated by measuring the short circuit duration or the short circuit frequency.

In the present embodiment, the value corresponding to the groove wall distance and the value corresponding to the torch height are obtained by detecting the arc voltages in the predetermined sections, and the voltage value itself is compared with the target value (voltage value). However, the present embodiment may be such that the groove wall distance and the torch height are actually calculated from the detected arc voltage or welding current, and the groove wall distance and the torch height are compared with corresponding target values (distance values).

As above, in the present embodiment, a ratio (hereinafter referred to as an "influence ratio") of an influence of the groove wall distance deviation $\Delta P_d$ with respect to each of the manipulated variable $\Delta z$ of the torch height and the manipulated variable $\Delta w$ of the weaving width and a ratio (hereinafter referred to as an "influence ratio") of an influence of the torch height deviation $\Delta P_h$ with respect to each of the manipulated variable $\Delta z$ of the torch height and the manipulated variable $\Delta w$ of the weaving width are set in accordance with the groove angle θ of the workpiece 5. Specifically, each of these influence ratios denotes an absolute value of a coefficient indicating a weight of the groove wall distance deviation $\Delta P_d$ in Formulas 7 and 8 or the torch height deviation $\Delta P_h$ in Formulas 7 and 8. The influence ratio of the groove wall distance deviation $\Delta P_d$ in the manipulated variable $\Delta w$ of the weaving width is represented by "$\delta_{wd}=4$", the influence ratio of the torch height deviation $\Delta P_h$ in the manipulated variable $\Delta w$ of the weaving width is represented by "$\delta_{wh}=8tK_h$", and a ratio ($\Delta P_h/\Delta P_d$) is represented by "$\delta_w=2tK_h$". The influence ratio of the groove wall distance deviation $\Delta P_d$ in the manipulated variable $\Delta z$ of the torch height is represented by "$\delta_{zd}=1/t$", the influence ratio of the torch height deviation $\Delta P_h$ in the manipulated variable $\Delta z$ of the torch height is represented by "$\delta_{zh}=K_h$", and a ratio ($\Delta P_h/\Delta P_d$) is represented by "$\delta_z=tK_h$". As a result, the calculation unit 21 calculates the manipulated variable $\Delta z$ of the torch height and the manipulated variable $\Delta w$ of the weaving width such that the influence ratios $\delta_{wh}$ and $\delta_{zh}$ of the torch height deviation become relatively larger than the influence ratios $\delta_{wd}$ and $\delta_{zd}$ of the groove wall distance deviation (the ratios $\delta_w$ and $\delta_z$ of the influence ratios become larger) as the groove angle θ becomes large.

For example, when the groove angle θ is 90° (that is, t=1), and the below-described adjustment coefficient $K_h$ is 1, the ratio $\delta_z$ of the influence ratio of the groove wall distance deviation $\Delta P_d$ and the influence ratio of the torch height deviation $\Delta P_h$ in the manipulated variable $\Delta z$ of the torch height is represented by "$\delta_z=2$ ($\Delta P_d:\Delta P_h=1:2$), and the ratio $\delta_w$ of the influence ratio of the groove wall distance deviation $\Delta P_d$ and the influence ratio of the torch height deviation $\Delta P_h$ in the manipulated variable $\Delta w$ of the weaving width is represented by "$\delta_w=1$ ($\Delta P_d:\Delta P_h=1:1$). As another example, when the groove angle θ is 120° (that is, t=1.73), and the adjustment coefficient $K_h$ is 1, the influence ratio $\delta_z$ in the manipulated variable $\Delta z$ of the torch height is represented by "$\delta_z=3.46$ ($\Delta P_d:\Delta P_h=1:3.46$), and the influence ratio $\delta_w$ in the manipulated variable $\Delta w$ of the weaving width is represented by "$\delta_w=1.73$ ($\Delta P_d:\Delta P_h=1:1.73$)". As above, as the groove angle θ becomes large, the influence of the torch height deviation $\Delta P_h$ becomes larger than the influence of the groove wall distance deviation $\Delta P_d$ in each of the manipulated variables $\Delta z$ and $\Delta w$ (the ratios $\delta_w$ and $\delta_z$ of the influence ratios become large).

The control unit 22 performs a control operation of driving the horizontal and vertical actuators 13 and 14 based on the respective manipulated variables calculated by the calculation unit 21 to cause the welding torch 11 to move.

According to the above configuration, each of the manipulated variable $\Delta z$ of the actuator 14 regarding the torch height and the manipulated variable $\Delta w$ of the actuator 13 regarding the weaving width is calculated by using both the average arc voltage value of one weaving cycle detected by the sensor 4 and the average arc voltage value of the weaving end portion section detected by the sensor 4. In addition, the influence ratios (weight coefficients) by which parameters regarding the groove wall distance deviation $\Delta P_d$ and the torch height deviation $\Delta P_h$ in the respective manipulated variables are multiplied are set in accordance with the groove angle θ of the workpiece 5. Then, by realizing a setting in which the influence ratio of the torch height deviation $\Delta P_h$ becomes larger than the influence ratio of the groove wall distance deviation $\Delta P_d$ in each manipulated variable as the groove angle θ of the workpiece 5 becomes large, the weaving width w and the torch height z can be quickly, optimally controlled without decreasing the gain. Therefore, by introducing this control model, the weaving width control operation and the torch height control operation can be simultaneously, sophisticatedly performed.

Figure 5A:
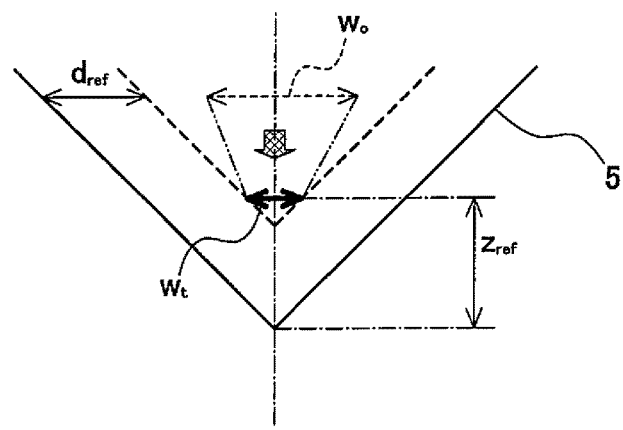
FIG. 5A is a schematic diagram conceptually showing a welding torch control operation of the welding system shown in FIG. 1.
Figure 5B:
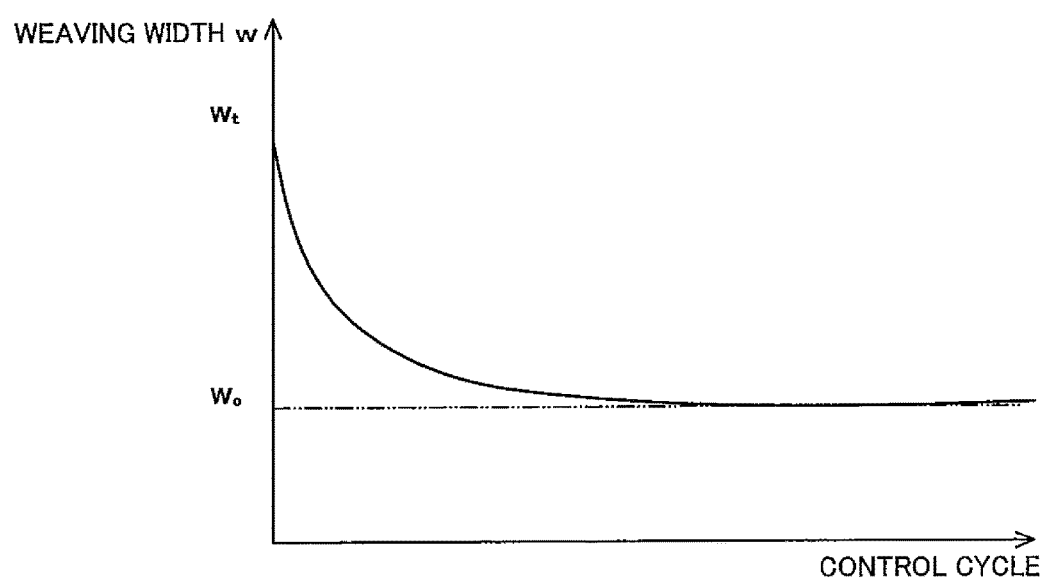
FIG. 5B is a schematic diagram conceptually showing the welding torch control operation of the welding system shown in FIG. 1.
Figure 11A:
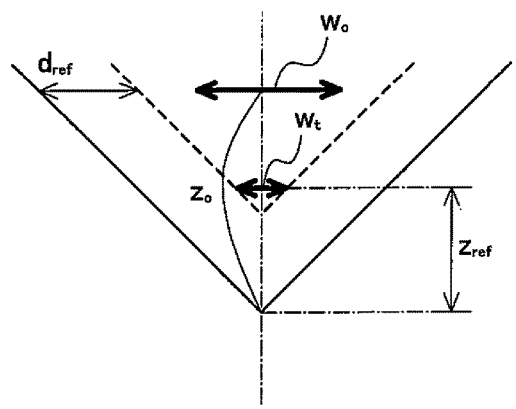
FIG. 11A is a schematic diagram for explaining problems in a conventional arc sensor weaving width control operation.
Figure 11B:
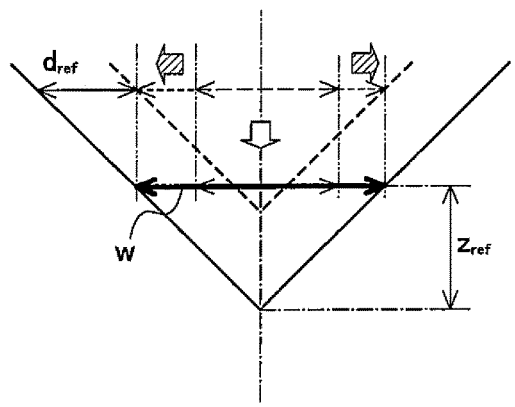
FIG. 11B is a schematic diagram for explaining problems in the conventional arc sensor weaving width control operation.
Figure 11C:
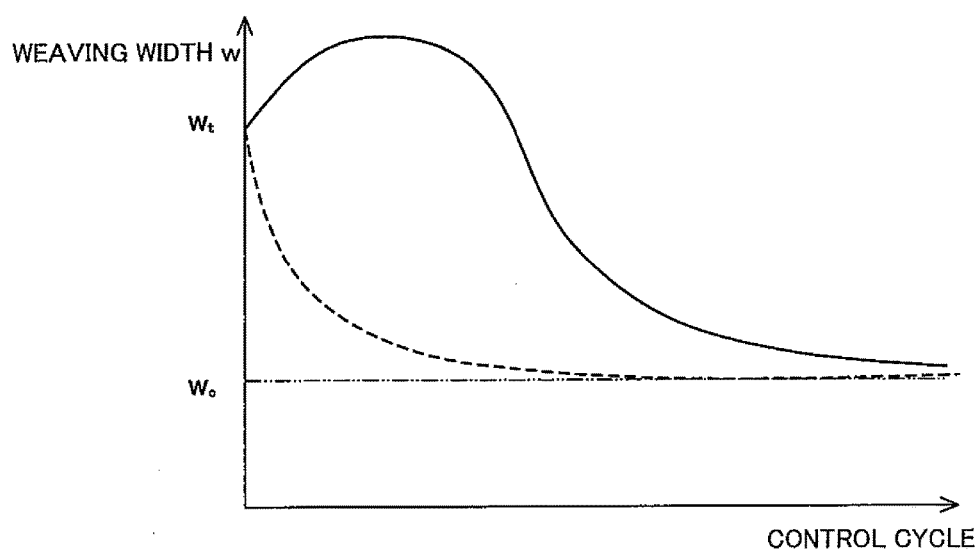
FIG. 11C is a schematic diagram for explaining problems in the conventional arc sensor weaving width control operation.

Each of FIGS. 5A and 5B is a schematic diagram conceptually showing a welding torch control operation of the welding system shown in FIG. 1. FIGS. 5A and 5B are diagrams respectively corresponding to FIGS. 11A and 11C showing a conventional example. According to the present embodiment, since the torch height control operation is performed simultaneously with the weaving width control operation, the welding torch 11 and the workpiece 5 can be prevented from abnormally getting close to each other as shown in FIG. 5A, and the weaving width can be caused to gradually get close to the target weaving width $w_t$ from the initial weaving width $w_0$ within a short control cycle as shown in FIG. 5B.

As shown by Formulas 7 and 8, the manipulated variable is obtained by multiplying the influence ratio by the adjustment coefficient $K_h$ that adjusts the influence ratio. With this, even if the groove angle θ stays the same, a more preferable control performance can be realized depending on the shape and use of the workpiece 5. The adjustment coefficient $K_h$ is not indispensable and may be fixed to 1.

The present embodiment has explained the configuration of detecting the arc voltage, but a configuration of detecting the welding current may be used. In this case, since the relation between the current and the distance becomes opposite to the relation between the voltage and the distance (as the distance increases, the voltage increases, but the current decreases), a minus (−) sign is added to each formulas of Formula 6 (that is, Formulas 7 and 8). Moreover, since the arc sensor control operation using the welding current is generally performed in, for example, the MIG welding, the MAG welding, and the CO2 welding, it is preferable that a detected value for the calculation of the manipulated variable be also the welding current value. For example, since the arc sensor control operation using the arc voltage is generally performed in the TIG welding, it is preferable that the detected value for the calculation of the manipulated variable be also the arc voltage value.

Example 1

Figure 6A:
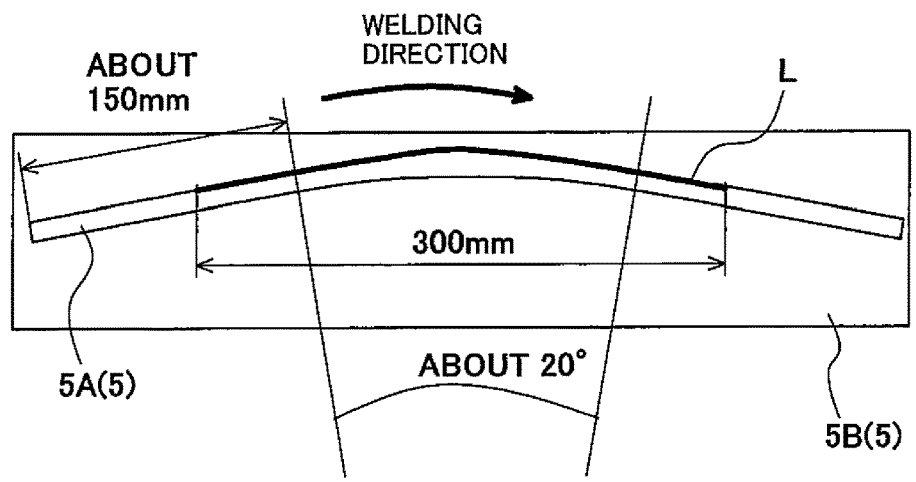
FIG. 6A is a side view showing the shape of the workpiece used in Example 1.
Figure 6B:
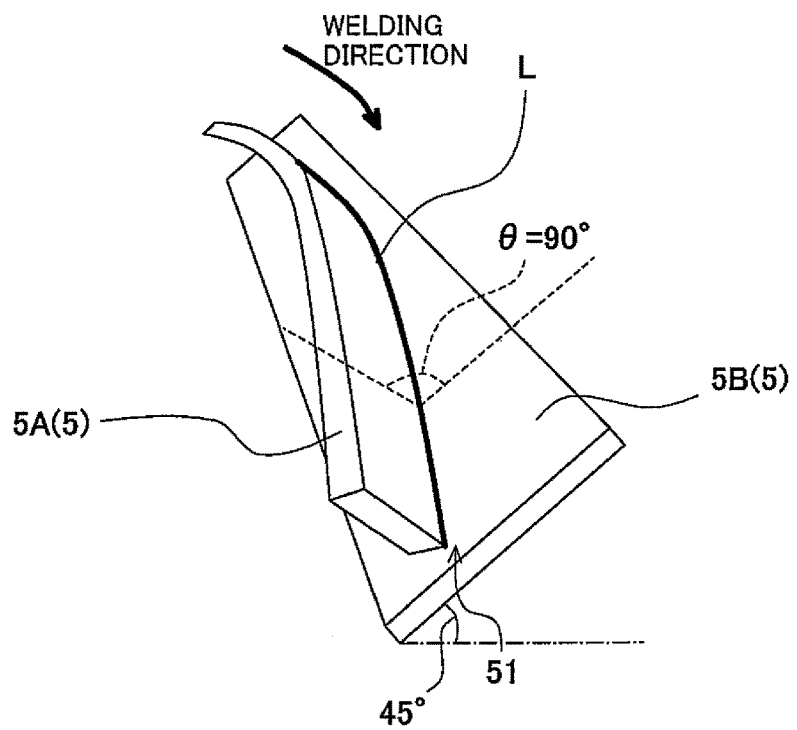
FIG. 6B is a perspective view showing the shape of the workpiece used in Example 1.

An experiment was carried out, in which the welding system of the above embodiment actually performed the TIG welding with respect to the workpiece. Each of FIGS. 6A and 6B is a diagram showing the shape of the workpiece used in Example 1. FIG. 6A is a side view, and FIG. 6B is a perspective view. As shown in FIGS. 6A and 6B, the present example has verified the weld line tracking in a case where as the workpiece 5, a side surface, perpendicular to a short axis, of a steel plate 5A shaped such that a plate surface thereof is curved around a short-direction axis at a longitudinal middle portion thereof was welded to a steel plate 5B inclined at 45° (groove angle θ=90°). In the case of welding the workpiece 5 from the left side to the right side in FIG. 6A, a weld line L was such that the welding torch 11 moved to the left in a proceeding direction while it was moving up, and the welding torch 11 moved past a middle portion and then moved to the right in the proceeding direction while it was moving down.

Welding conditions of the present example were set as below.

TABLE 1

| Items | Values | Remarks |
|---|---|---|
| Welding Speed | 15 cm/min. | |
| Weaving Width | 10 mm | Initial Setting Value |
| Weaving Frequency | 2 Hz | |
| Weaving Pattern | Simple Harmonic Motion | |
| Torch Height of Weaving Center | 10 mm | Initial Setting Value |
| Welding Length | 300 mm | Horizontal Distance in Torch Moving Direction |

Then, respective control parameters of Formula 6 in the present example were set as below. While performing the weld line tracking, the manipulated variable of the weaving width and the manipulated variable of the torch height were calculated using Formula 6 based on the detected arc voltage value, and the control operation of the welding torch 11 was performed. The arc sensor control operation was not performed for several seconds from the start until the arc stabilized. Only two points that are a welding start position and a welding end position were taught to the welding manipulator 1, and the welding manipulator 1 was set such that when the control operation was not performed, the welding torch 11 moves on a straight line connecting these two points.

TABLE 2

| Items | Symbols | Values |
|---|---|---|
| Left and Right Gains | $K_y$ | 0.2 mm/V |
| Adjustment Coefficient | $K_h$ | 1 |
| Δz Gain | $K_z$ | 1 mm/V |
| Δw Gain | $K_w$ | 0.2 mm/V |

Figure 7A:
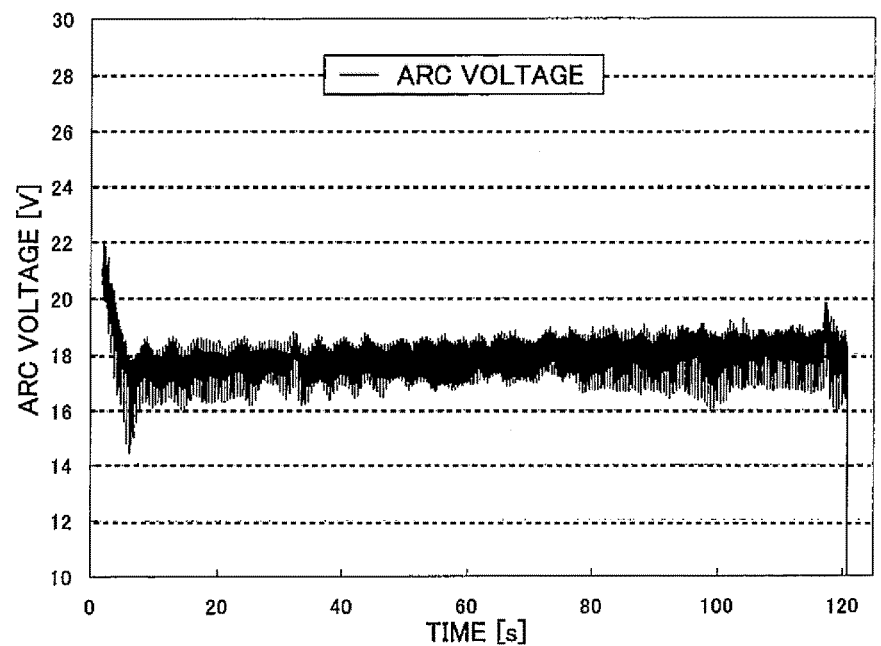
FIG. 7A is a diagram showing the arc voltage detected in an arc sensor control operation in Example 1.
Figure 7B:
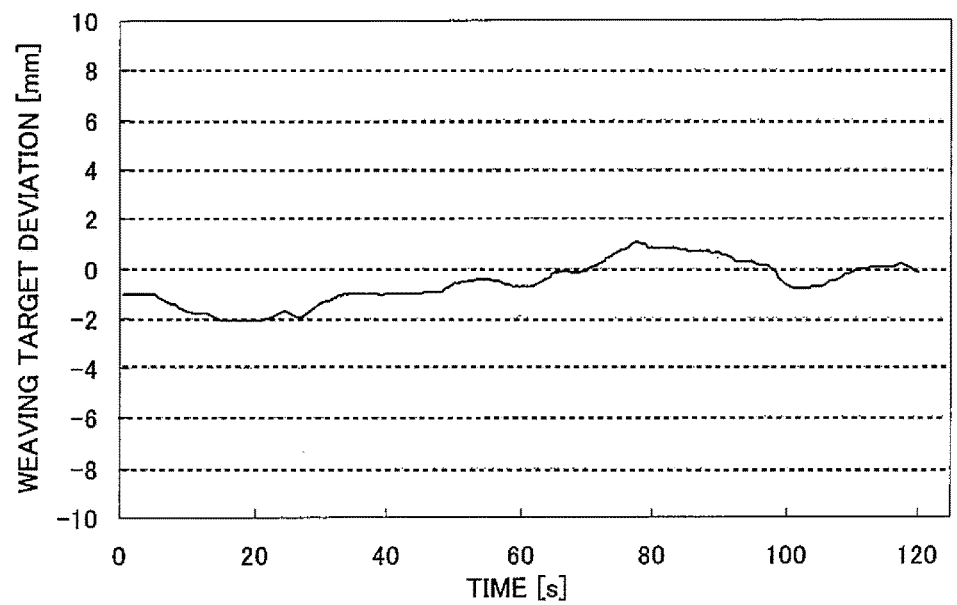
FIG. 7B is a diagram showing a deviation of a weaving width from a target value in the arc sensor control operation in Example 1.
Figure 8A:
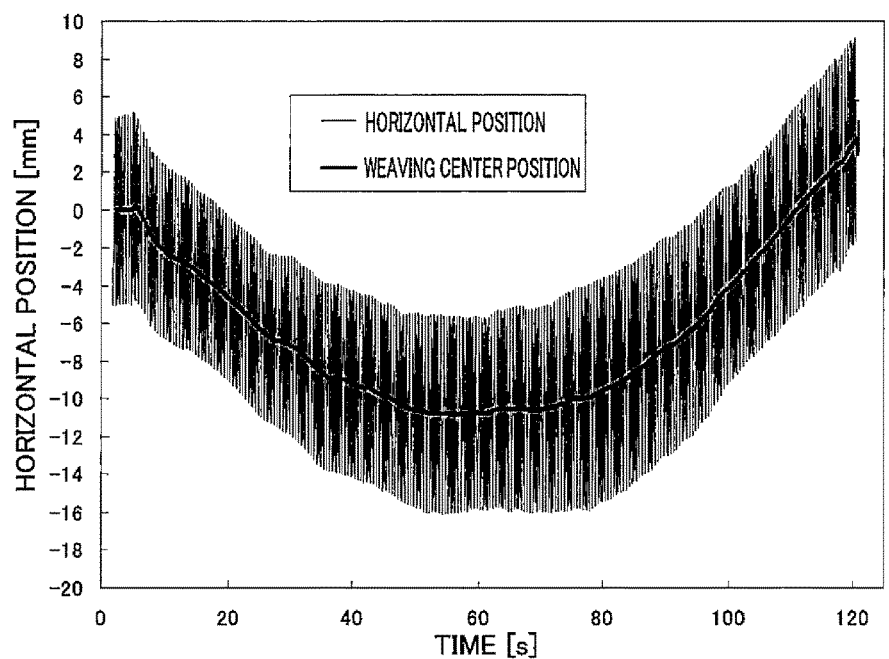
FIG. 8A is a diagram showing a horizontal position trajectory of the welding torch in the arc sensor control operation in Example 1.
Figure 8B:
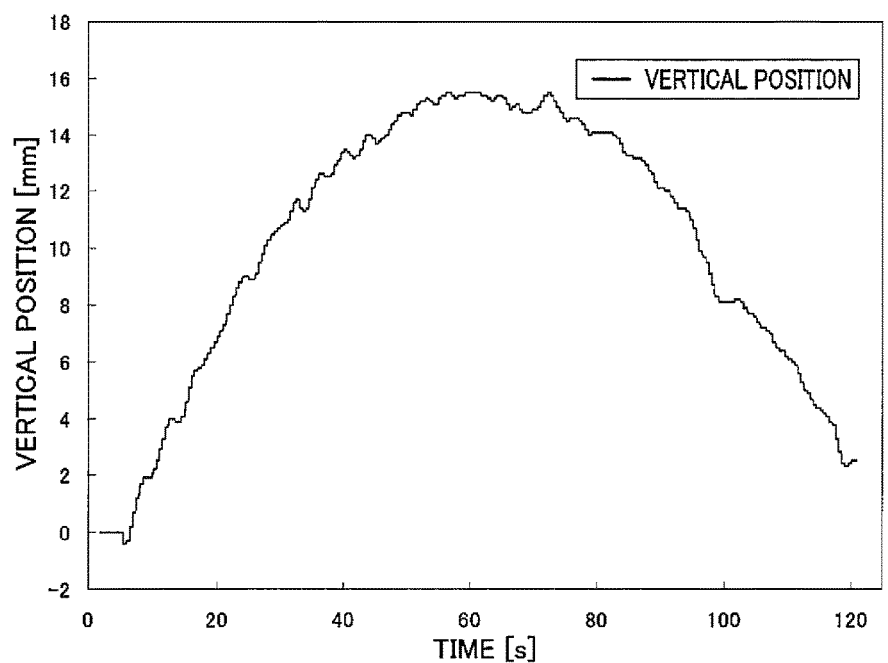
FIG. 8B is a diagram showing a vertical position trajectory of the welding torch in the arc sensor control operation in Example 1.

Results of actual welding operations performed under the above conditions are shown in FIGS. 7A, 7B, 8A, and 8B. FIGS. 7A, 7B, 8A, and 8B are diagrams showing results of the arc sensor control operations in Example 1. FIG. 7A is a diagram showing the detected arc voltage. FIG. 7B is a diagram showing the deviation of the weaving width from the target value. FIG. 8A is a diagram showing the trajectory of the horizontal position of the welding torch. FIG. 8B is a diagram showing the trajectory of the vertical position of the welding torch. In FIGS. 8A and 8B, the initial value is set to zero.

As shown in FIGS. 8A and 8B, in the present example, both the horizontal position regarding the weld line tracking and the vertical position regarding the torch height control operation sophisticatedly tracked the curved line of the weld line. Especially, due to the shape of the workpiece 5 of the present example, in the first half of the welding operation, since the weld line L extended upward, and the welding torch moved horizontally, a relative distance between the welding torch 11 and the workpiece 5 shortened. With this, as shown in FIG. 7B, the weaving width was comparatively small. This can also be confirmed by the horizontal position and weaving amplitude in the first half of FIG. 8A. In contrast, in the second half of the welding operation, since the weld line L extended downward, and the welding torch moved horizontally, the relative distance between the welding torch 11 and the workpiece 5 lengthened. With this, as shown in FIG. 7B, the weaving width was comparatively large. This can also be confirmed by the horizontal position and weaving amplitude in the second half of FIG. 8A. As above, the present example has shown that the arc welding was being faithfully performed in accordance with the shape of the workpiece 5.

Example 2

Further, an experiment was carried out, in which the control mode of the present embodiment was compared with Comparative Example. In the present example, as with Example 1, the control operation was performed using Formula 6 based on welding conditions below.

TABLE 3

| Items | Value |
|---|---|
| Welding Speed | 20 cpm |
| Initial Value of Weaving Width | 8 mm |
| Target Value of Weaving Width | 11 mm |
| Weaving Frequency | 2 Hz |
| Weaving Pattern | Simple Harmonic Motion |
| Initial Value of Torch Height of Weaving Center | 14 mm |
| Target Value of Torch Height of Weaving Center | 10 mm |

In Comparative Example, the manipulated variable Δz of the torch height was calculated using a formula obtained by removing a term "$V_{dref}-(V_{dl}+V_{dr})/2$" from the formula of Δz of Formula 6, and the manipulated variable Δw of the weaving width was calculated using a formula obtained by removing a term "$V_{href}-V_h$" from the formula of Δw of Formula 6. To be specific, in Comparative Example, the control operation was performed such that a value of a groove wall distance direction did not contribute to the calculation of the manipulated variable Δz of the torch height, and a value of the torch height did not contribute to the calculation of the manipulated variable Δw of the weaving width. For facilitating the comparison, the values of respective gains were set to be different between the present example and Comparative Example. The arc sensor control operation was not performed for several seconds from the start until the arc stabilized.

Figure 9A:
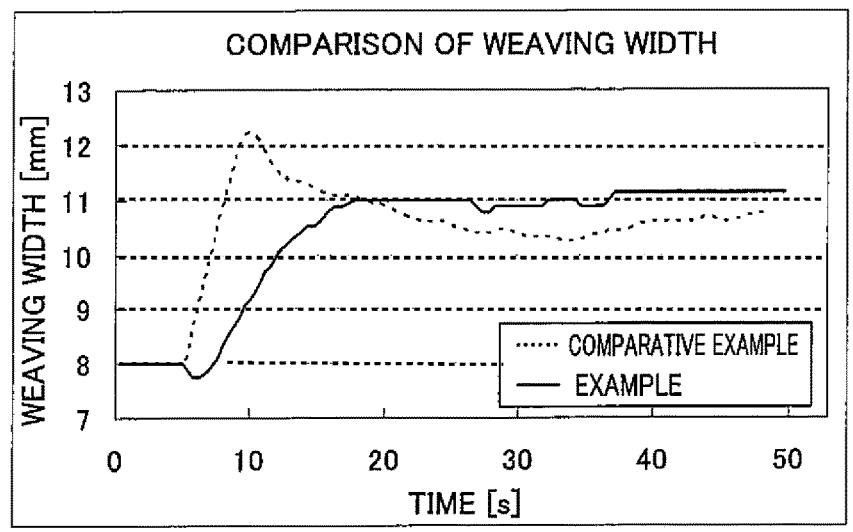
FIG. 9A is a diagram showing a time change of the weaving width in the arc sensor control operation in Example 2 and Comparative Example.
Figure 9B:
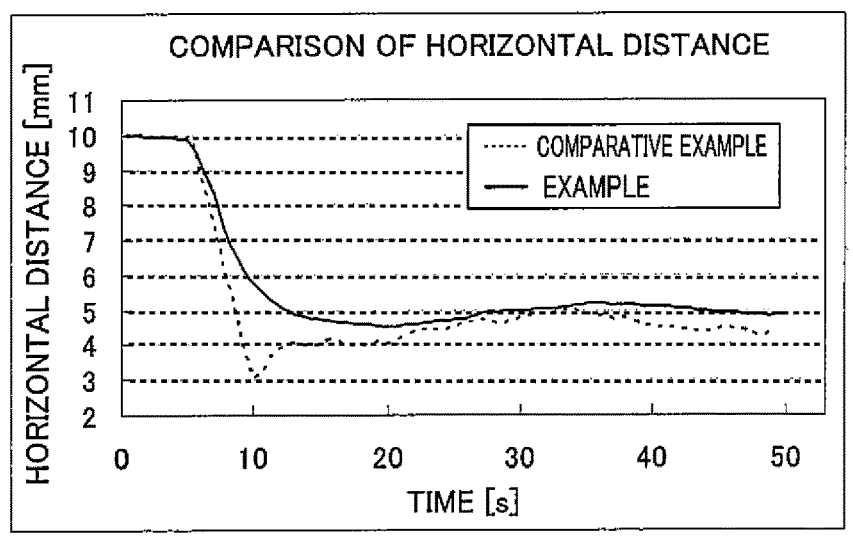
FIG. 9B is a diagram showing a time change of a horizontal distance between a weaving end and the workpiece in the arc sensor control operation in Example 2 and Comparative Example.
Figure 10A:
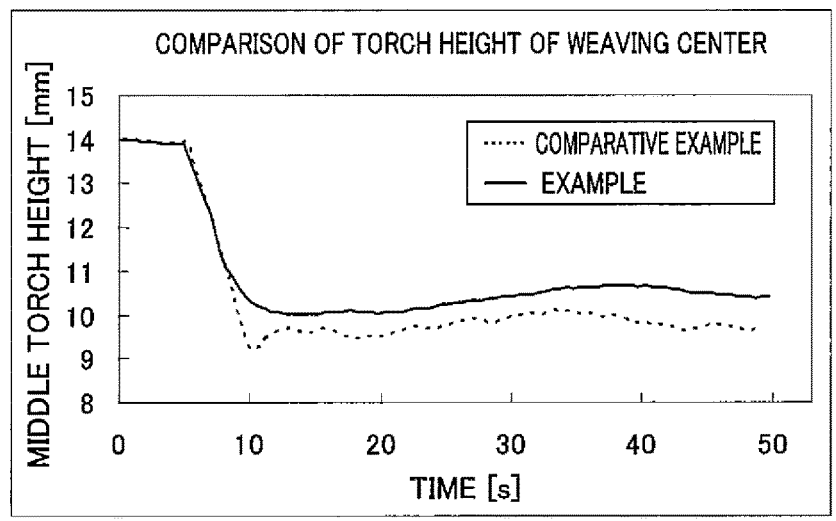
FIG. 10A is a diagram showing a time change of a torch height of a weaving center in the arc sensor control operation in Example 2 and Comparative Example.
Figure 10B:
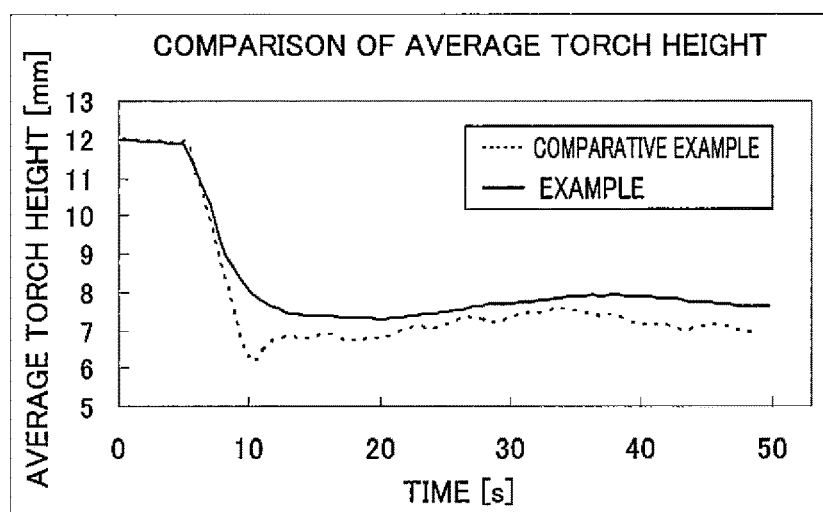
FIG. 10B is a diagram showing a time change of an average torch height in the arc sensor control operation in Example 2 and Comparative Example.

Results of actual welding operations performed under the above conditions are shown in FIGS. 9A, 9B, 10A, and 10B. FIGS. 9A, 9B, 10A, and 10B are diagrams showing results of the arc sensor control operations in Example 2 and Comparative Example. FIG. 9A is a diagram showing a time change of the weaving width. FIG. 9B is a diagram showing a time change of the horizontal distance between the weaving end and the workpiece. FIG. 10A is a diagram showing a time change of the torch height of the weaving center. FIG. 10B is a diagram showing a time change of the average torch height.

As shown in FIG. 9A, in Comparative Example, the weaving width overshot immediately after the start of the control operation. To be specific, as shown in FIG. 9B, the horizontal distance between the welding torch 11 and the workpiece 5 abnormally got close to each other. This abnormal closeness becomes a cause of the weld defect, such as undercut. In contrast, in the present example, the weaving width control operation was smoothly performed without causing the overshoot, there was no fear of the weld defect unlike Comparative Example, and the weaving width was stable after a predetermined period of time. Regarding the torch height, as shown in FIGS. 10A and 10B, the torch height overshot immediately after the start of the control operation in Comparative Example whereas the torch height was smoothly, stably controlled in the present example. As is clear from the above, by using the control method of the present embodiment, each of the weaving width and the torch height can quickly become the target value without causing the overshoot.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

The embodiment of the present invention has been explained as above. However, the present invention is not limited to the above embodiment. Various improvements, changes, and modifications may be made within the spirit of the present invention.

INDUSTRIAL APPLICABILITY

The arc welding control system and method of the present invention are useful for simultaneously, sophisticatedly performing the weaving width control operation and the torch height control operation.

REFERENCE SIGNS LIST 1 welding manipulator
2 calculation control unit
3 welding power source
4 sensor
5 workpiece
11 welding torch
12 electrode
13 horizontal actuator
14 vertical actuator
21 calculation unit
22 control unit
41 voltage sensor
42 current sensor
51 groove
θ groove angle

The invention claimed is:

1. A method of controlling an arc sensor for arc welding for obtaining beads in a groove of a workpiece that is a welding target, the method utilizing: an actuator configured to cause a welding torch to track a weld line of the workpiece by causing the welding torch to move in a direction of the weld line of the workpiece at a specified torch height while causing the welding torch to move in a cyclic manner in a width direction of the groove of the workpiece with a specified weaving width; and a sensor configured to detect a welding current or an arc voltage, the method comprising the steps of:
detecting the welding current or the arc voltage;
obtaining from the welding current or the arc voltage a value corresponding to a groove wall distance indicating a horizontal distance between the welding torch and the workpiece at a weaving end portion and a value corresponding to the torch height to calculate a difference between the value corresponding to the groove wall distance and a target value and a difference between the value corresponding to the torch height and a target value;
calculating a manipulated variable of the actuator regarding the weaving width using a groove wall distance deviation that is a deviation of the value corresponding to the groove wall distance from the target value and a torch height deviation that is a deviation of the value corresponding to the torch height from the target value, and
calculating a manipulated variable of the actuator regarding the torch height using the groove wall distance deviation and the torch height deviation; and
controlling the weaving width and the torch height based on the manipulated variable regarding the weaving width and the manipulated variable regarding the torch height, wherein:
a first ratio that is a ratio of a degree of an influence of the groove wall distance deviation with respect to each of the manipulated variable of the weaving width and the manipulated variable of the torch height and a second ratio that is a ratio of a degree of an influence of the torch height deviation with respect to each of the manipulated variable of the weaving width and the manipulated variable of the torch height are set in accordance with a groove angle of the workpiece; and
the first ratio and the second ratio are set such that as the groove angle becomes large, the second ratio becomes relatively larger than the first ratio.

2. The method according to claim 1, wherein the manipulated variable of the actuator regarding the weaving width is obtained by multiplying the first ratio by an adjustment coefficient for adjusting the first ratio, and the manipulated variable of the actuator regarding the torch height is obtained by multiplying the second ratio by an adjustment coefficient for adjusting the second ratio.

3. The method according to claim 1, further comprising the steps of: calculating an average value of the welding current or arc voltage for each of a plurality of sections of one weaving cycle, the welding current or arc voltage being detected by the sensor, the plurality of sections being obtained by dividing one weaving cycle into a predetermined number;

obtaining the value corresponding to the groove wall distance based on the average value of one or a plurality of sections corresponding to the weaving end portion among the plurality of sections; and obtaining the value corresponding to the torch height based on the average value of the welding current or arc voltage of one weaving cycle.

4. The method according to claim 2, wherein:

a manipulated variable $\Delta z$ of the torch height is represented by Formula 1 below; and a manipulated variable $\Delta w$ of the weaving width is represented by Formula 2 below, $$\Delta z = K_z \left( -\frac{\Delta P_d}{t} + 2K_h \Delta P_h \right) \qquad \text{Formula 1}$$

$$\Delta w = 4K_w(-\Delta P_d + tK_h \Delta P_h) \qquad \text{Formula 2}$$

where $K_z$ denotes a gain of the manipulated variable regarding the torch height, $K_w$ where $K_z$ denotes a gain of the manipulated variable regarding the torch height, $K_w$ denotes a gain of the manipulated variable regarding the weaving width, $\Delta P_d$ denotes the groove wall distance deviation, $\Delta P_h$, denotes the torch height deviation, t denotes a value represented by "$t=\tan(\theta/2)$" where $\theta$ denotes the groove angle, and $K_h$ denotes the adjustment coefficient.

* * * * *